US007215963B2

(12) United States Patent
Hacena et al.

(10) Patent No.: US 7,215,963 B2
(45) Date of Patent: May 8, 2007

(54) WIRELESS COMMUNICATION NETWORK FOR PROCESSING CALL TRAFFIC OVER A BACKHAUL NETWORK

(75) Inventors: Farid Hacena, Aurora, IL (US); Koji Nagai, Naperville, IL (US)

(73) Assignee: Lucent Technolgies Inc., Murray Hill, NJ (US)

( * ) Notice: Subject to any disclaimer, the term of this patent is extended or adjusted under 35 U.S.C. 154(b) by 212 days.

(21) Appl. No.: 10/785,602

(22) Filed: Feb. 24, 2004

(65) Prior Publication Data

US 2005/0192014 A1  Sep. 1, 2005

(51) Int. Cl.
*H04Q 7/20* (2006.01)

(52) U.S. Cl. ...................... 455/445; 709/230

(58) Field of Classification Search ............... 455/445, 455/524, 406, 403, 423, 412; 379/114.15, 379/211.02, 229; 370/342; 709/230, 246
See application file for complete search history.

(56) References Cited

U.S. PATENT DOCUMENTS

| | | | | |
|---|---|---|---|---|
| 5,717,737 A | * | 2/1998 | Doviak et al. .............. 455/403 |
| 6,005,929 A | * | 12/1999 | Chemin .................. 379/211.02 |
| 6,069,947 A | * | 5/2000 | Evans et al. ................. 379/229 |
| 6,501,950 B1 | * | 12/2002 | Smith et al. ................. 455/423 |
| 2002/0118665 A1 | * | 8/2002 | Cleveland et al. .......... 370/342 |
| 2002/0123365 A1 | * | 9/2002 | Thorson et al. ............. 455/524 |
| 2003/0158954 A1 | * | 8/2003 | Williams .................... 709/230 |
| 2004/0017904 A1 | * | 1/2004 | Williams et al. ....... 379/114.15 |
| 2004/0147265 A1 | * | 7/2004 | Kelley et al. ................ 455/445 |
| 2004/0203580 A1 | * | 10/2004 | Engelhart .................... 455/406 |

* cited by examiner

*Primary Examiner*—Joseph Feild
*Assistant Examiner*—Michael T. Vu

(57) ABSTRACT

A wireless communications network, a method of operating a wireless communications network, and a wireless network controller are described. The wireless communication network comprises a call processing system, a translator system, a first base station system, and a second base station system. The first base station system transfers first call traffic in a first format to the call processing system. The second base station system transfers second call traffic in a second format to the translator system. The translator system converts the second call traffic from the second format to the first format and transfers the second call traffic in the first format to the call processing system. The call processing system processes the first call traffic and the second call traffic.

12 Claims, 7 Drawing Sheets

WIRELESS COMMUNICATION NETWORK FOR PROCESSING CALL TRAFFIC OVER A BACKHAUL NETWORK

BACKGROUND OF THE INVENTION

1. Field of the Invention

The invention is related to wireless communication networks, and in particular, to wireless communication networks for processing call traffic over backhaul networks.

2. Description of the Prior Art

Recent growth in cellular telecommunications traffic has spurred an expansion of existing wireless networks and a build out of new wireless networks. These wireless networks include network elements connected across a backhaul network to process and transport communications. In the past, service providers, such as wireless communications companies, built their networks end-to-end with equipment purchased from a single equipment vendor. Constructing a network with equipment from a single vendor provides elements that interoperate over the backhaul network. However, rather than build networks with equipment from a single vendor, service providers may desire to build their networks with equipment acquired from multiple vendors.

One problem with building a network with equipment from multiple vendors is that often times equipment from one vendor is not able to interoperate with equipment from another vendor over the backhaul network. A typical network implementation includes a mobile switching center (MSC) coupled to multiple base station systems over a backhaul network. If the MSC and base station systems are all from a single vendor, they are able to communicate according to a single proprietary communication protocol. For example, an MSC from a particular vendor would understand the format of call traffic transferred from a base station system of the same vendor. In contrast, a network implemented with equipment from multiple vendors is undesired if the various elements are unable to operate together. For example, a base station system from one vendor may transfer call traffic in a format that an MSC from a different vendor is not able to process. Thus, service providers are prevented from purchasing equipment, such as new base station systems or MSCs, from multiple vendors if the equipment is not inter-operable.

To solve these problems, the telecommunications industry has proposed Inter-vendor Operating System (IOS) standards to support backhaul operations for multiple-vendor equipment. IOS is also sometimes referred to in the art as an Inter-vendor Operating Specification. However, building networks end-to-end with IOS equipment eliminates the technical advantages compiled by the equipment vendors over the course of developing their own proprietary standards. Additionally, implementing IOS standards across a network would require either removing legacy equipment or making expensive modifications to the legacy equipment. Thus, service providers may desire to implement networks with modified legacy equipment rather than removing the legacy equipment, and equipment vendors may desire to provide equipment inter-operable with IOS standards while retaining their own technical advantages.

SUMMARY OF THE SOLUTION

The invention solves the above problems and other problems with a wireless communication network and methods of operating a wireless communication network in exemplary embodiments described herein. In one embodiment of the invention, the wireless communication network comprises a network controller coupled to first and second base station systems over a backhaul network. The first base station system transfers call traffic in a first format to the network controller, and the second base station system transfers call traffic in a second format to the network controller. The network controller includes a call processing system and a translator system.

The call processing system receives the call traffic in the first format, and the translator system receives the call traffic in the second format. The first format is a format compatible with the call processing system, whereas the second format is not compatible with the call processing system. Therefore, the translator system is provided to convert the call traffic in the second format to the first format. The translator system then transfers the call traffic to the call processing system. Thus, the call processing system may be able to process call traffic from any base station system regardless of the call traffic format transferred by the base station systems.

In another embodiment of the invention, the translator system receives call traffic in the first format and converts the call traffic to the second format. The translator system then transfers the call traffic in the second format to another call processing system.

Advantageously, the present invention allows for base station systems to transfer call traffic in a format different from the format the call processing system is able to process. Thus, service providers are able to implement networks without having to remove or replace legacy equipment. Additionally, equipment vendors are able to provide equipment inter-operable with various formats while retaining their own technical advantages.

The invention may include other exemplary embodiments described below.

DESCRIPTION OF THE DRAWINGS

The same reference number represents the same element on all drawings.

DETAILED DESCRIPTION OF THE INVENTION

Figure 1:
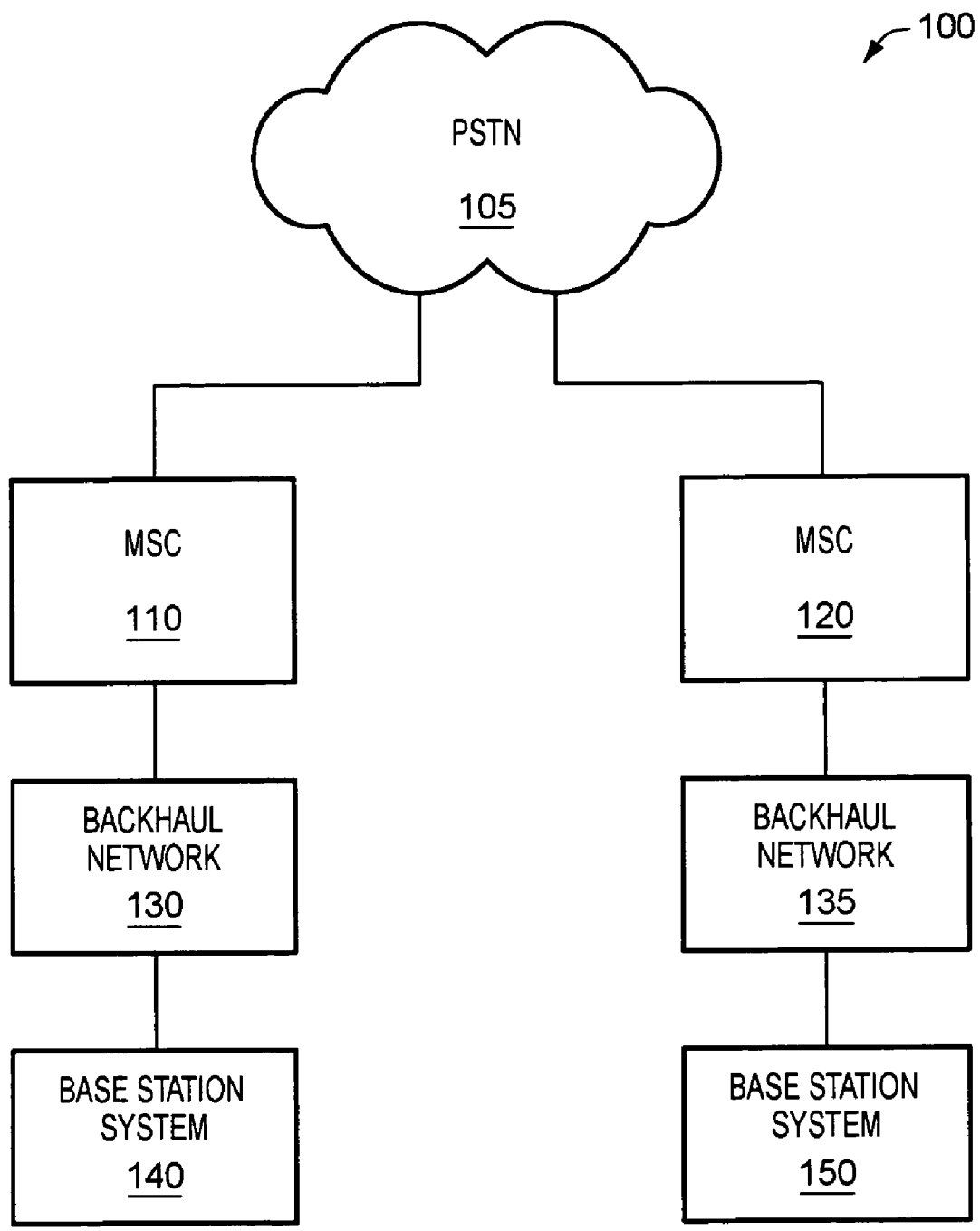
FIG. 1 illustrates a communication network in the prior art.

FIG. 1 illustrates the prior art to help better understand the invention. FIGS. 2–7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention.

Those skilled in the art will appreciate that the features described below can be combined in various ways to form multiple embodiments of the invention. As a result, the invention is not limited to the specific embodiments described below, but only by the claims and their equivalents.

Prior Art Communication Network—FIG. 1

FIG. 1 illustrates communication network 100 in the prior art to help in better understanding the invention. Communication network 100 includes MSCs 110 and 120 coupled to PSTN 105. MSC 110 is further coupled to base station system 140 by backhaul network 130. MSC 120 is coupled to base station system 150 by backhaul network 135. MSCs 110 and 120 typically interface wireless communications to PSTN 105. For example, base station system 140 receives communications from a caller using a cell phone and transfers the communications to MSC 110. MSC 110 receives communications for the call and transfers the communications to PSTN 105. PSTN 105 then routes the communications to the appropriate destination. MSC 120 operates in a similar fashion.

In this example of the prior art, MSC 110 and base station system 140 are from a first vendor and transfer communications in a proprietary format over backhaul network 130. MSC 120 and base station system 150 are from a second vendor and transfer communications in an IOS format over backhaul network 135. MSC 110 is unable to process communications from base station system 150 because base station system 150 does not transfer communications in the proprietary format and MSC 110 only understands communications in the proprietary format. Similarly, MSC 120 is unable to process communications from base station system 140 because MSC 120 only understands communications in the IOS format.

The prior art configuration of communication network 100 presents several problems. For instance, base station system 150 is unable to communicate with MSC 110, and base station system 140 is unable to communicate with MSC 120. Additionally, a service provider is prevented from adding a new base station system to communicate with MSC 110 over backhaul network 130 unless the base station system transfers communications according to the proprietary format understood by MSC 110. Such a restriction limits the vendors from which the service provider can acquire a new base station system. Furthermore, communication network 100 is unable to execute important call processing operations such as call handoffs because MSCs 110 and 120 are unable to communicate with base station systems 150 and 140 respectively.

Figure 2:
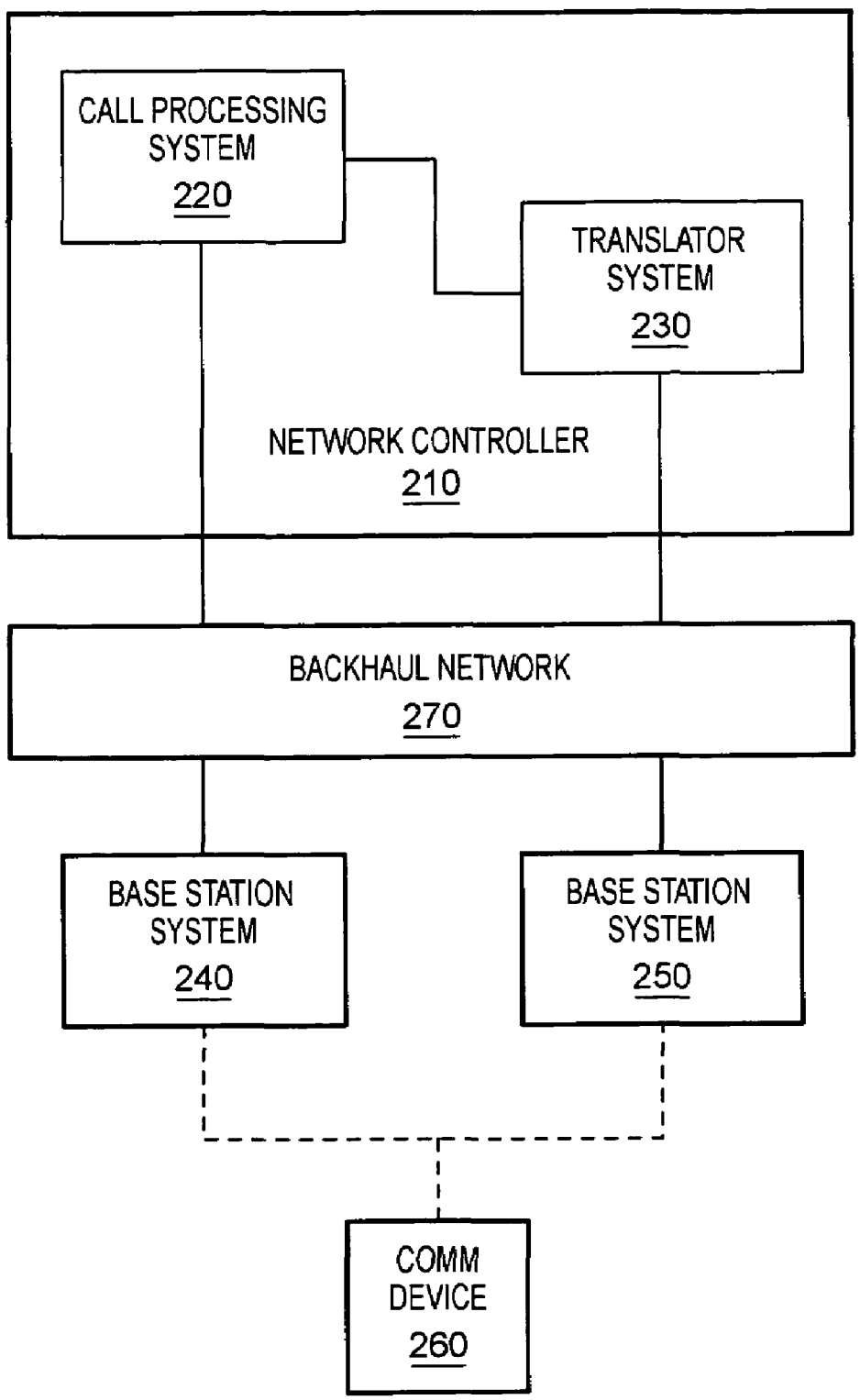
FIG. 2 illustrates a communication network in an embodiment of the invention.
Figure 3:
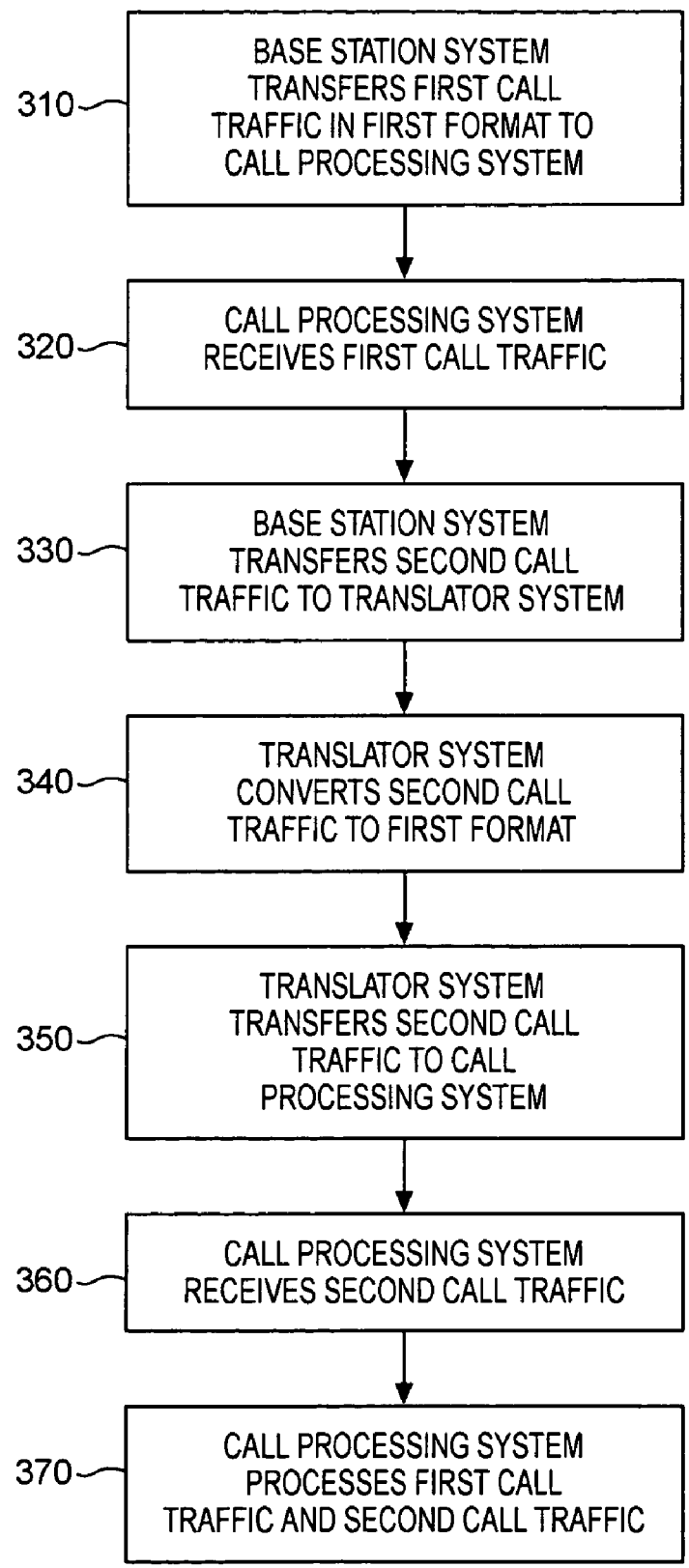
FIG. 3 is a flow chart that illustrates the operation of the communication network of FIG. 2 in an embodiment of the invention.

First Embodiment Configuration and Operation—FIGS. 2–3

FIG. 2 illustrates communication network 200 in an embodiment of the invention. Communication network 200 includes network controller 210, base station system 240, base station system 250, communication device 260, and backhaul network 270. Network controller 210 includes call processing system 220 and translator system 230. Base station system 240 is coupled to call processing system 220 over backhaul network 270. Base station system 250 is coupled to translator system 230 over backhaul network 270. Translator system 230 is coupled to call processing system 220. Communication device 260 is in communication with base station systems 240 and 250 over a wireless communication standard well known to those skilled in the art. Backhaul network 270 may include other devices, systems, or components not shown for the sake of brevity. Similarly, base station systems 240 and 250 may include additional elements, such as digital signal processors, transceivers, and other components well known to those in the art. Network controller 210 may also include additional elements well known to those in the art but not shown for the sake of brevity.

Communication device 260 could be any device capable of transmitting communications receivable by base station systems 240 and 250. For example, communication device 260 could comprise a wireless phone, personal digital assistant (PDA), two-way radio, or a portable computer. Base station systems 240 and 250 comprise any systems capable of receiving wireless communications for a call transmitted from communication device 260 and transferring call traffic for the call to network controller 210. Base station system 240 and 250 could include, for example, a base transceiver station (BTS). Network controller 210 comprises any system capable of handling call traffic from base station systems 240 and 250. For example, network controller 210 could comprise an MSC, a radio network controller (RNC), or a base station controller (BSC). Network controller 210 may handle call traffic to route calls from cellular devices to destinations on the PSTN or to destinations on its own wireless network or other wireless networks.

In some embodiments, base station system 240 communicates with call processing system 220 according to a first format, and base station system 250 communicates with translator system 230 according to a second format. In another embodiment of the invention, network controller 210 and base station system 240 are from a first vendor, and base station system 250 is from a second vendor that is different than the first vendor. In another embodiment of the invention, translator system 230 comprises a system capable of converting call traffic between the first format and the second format.

FIG. 3 is a flowchart that illustrates the operation of communication network 200 in an embodiment of the invention. The steps illustrated by FIG. 3 are not limited to the specific sequence provided and could occur in various sequences recognized by those having skill in the art.

To begin, communication device 260 transmits communications for a call to base station systems 240 and 250. The communications could be a data call from communication device 260 to a web server on the Internet or some other similar packet-based network. Alternatively, the call could be a phone call to a destination on the PSTN or another telecommunications network. Base station system 240 receives communications for the call from communication device 260 and transfers first call traffic for the call in the first format over backhaul network 270 to call processing system 220 (Step 310). Call processing system 220 receives the first call traffic in the first format from base station system 240 (Step 320).

Base station system 250 also receives communications for the call from communication device 260 and transfers second call traffic in the second format over backhaul network 270 to translator system 230 (Step 330). Translator system 230 receives the second call traffic and converts the second call traffic from the second format to the first format (Step 340). Next, translator system 230 transfers the second call traffic in the first format to call processing system 220 (Step 350). Call processing system 220 then receives the second call traffic in the first format from translator system 230 (Step 360). Lastly, call processing system 220 processes the first call traffic and the second call traffic (Step 370).

Advantageously, communication network 200 allows for base station system 250 to transfer call traffic in the second format. Additionally, communication network 200 allows network controller 210 to process call traffic from base station systems from multiple vendors. The ability to add base station systems from different vendors provides flexibility to service providers and reduces costs for service providers.

Figure 4:
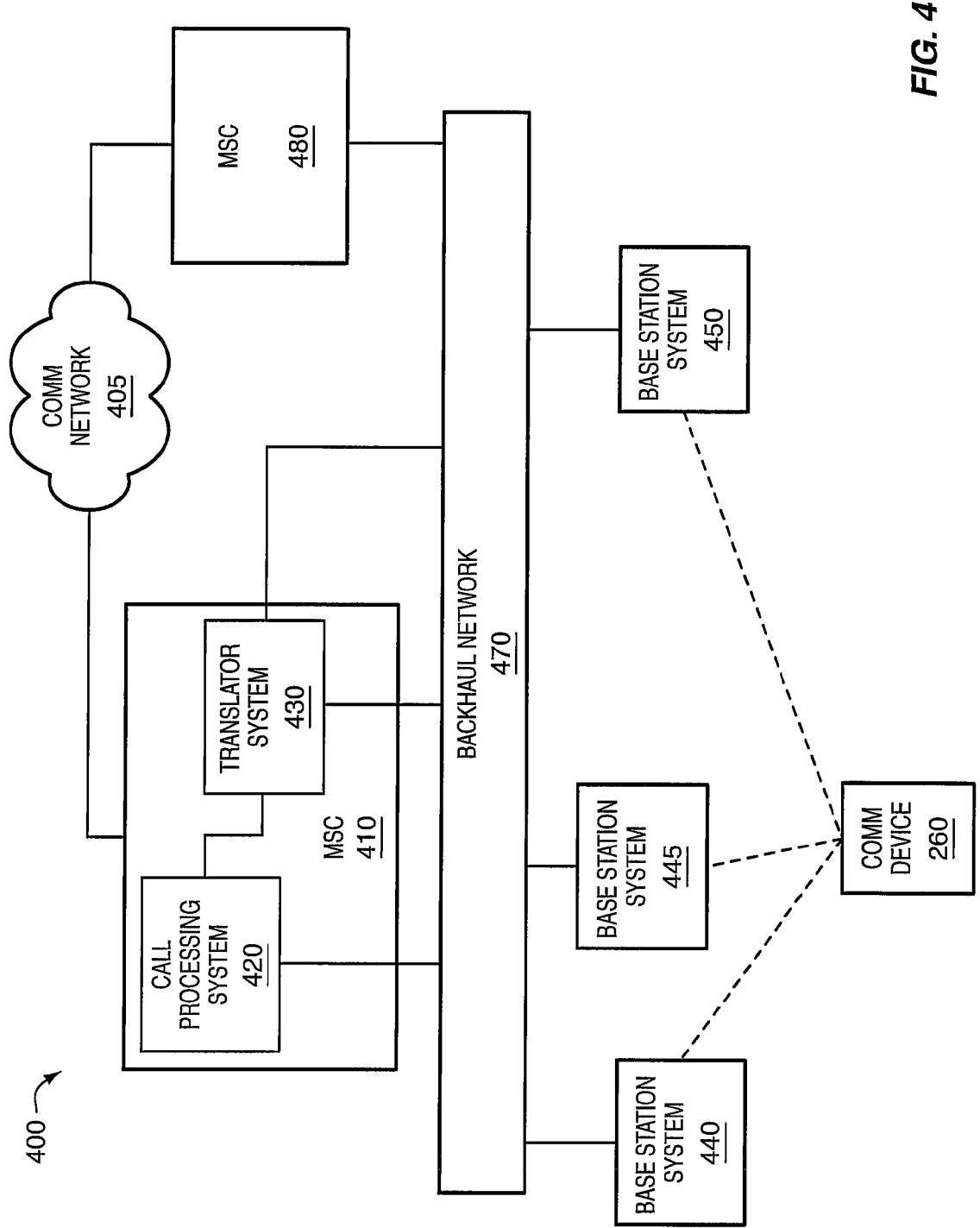
FIG. 4 illustrates another communication network in an embodiment of the invention.
Figure 5:
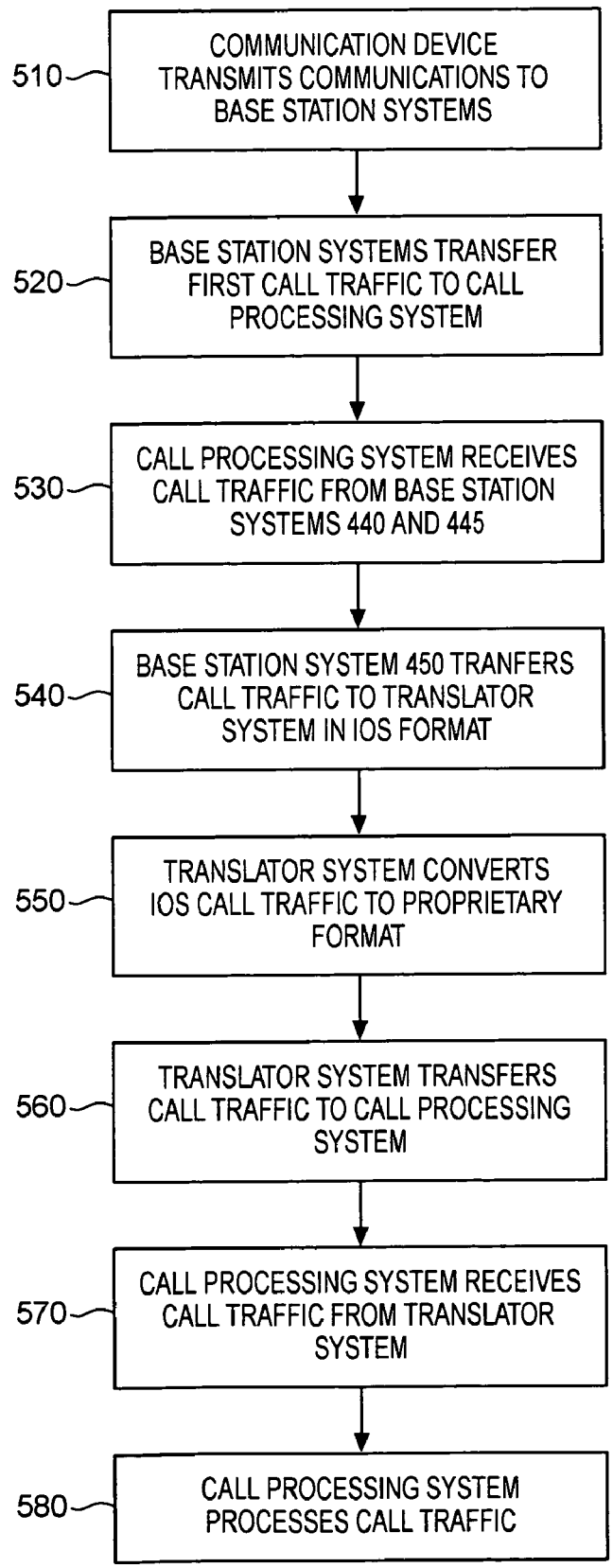
FIG. 5 is a flow chart that illustrates the operation of the communication network of FIG. 4 in an embodiment of the invention.
Figure 6:
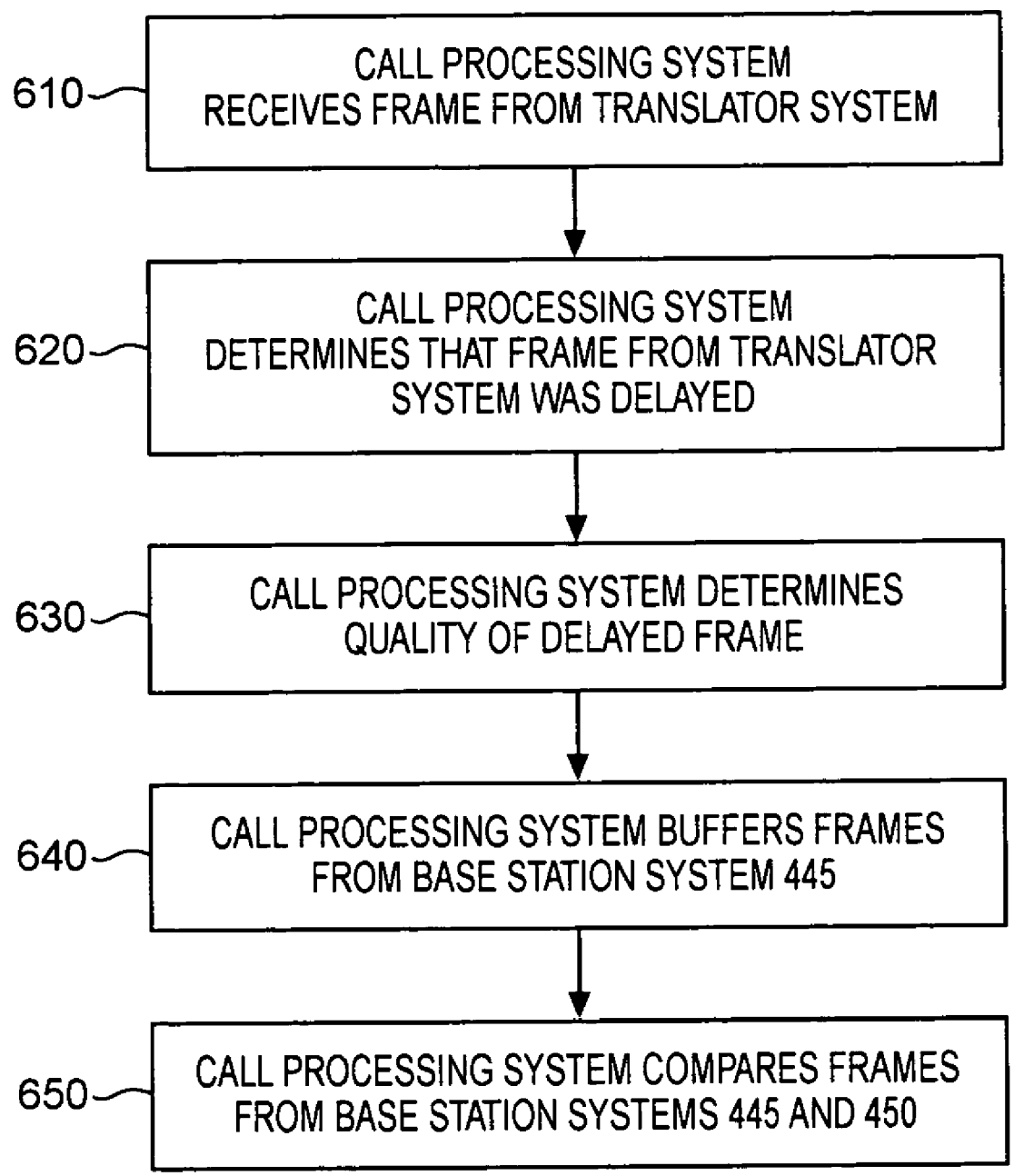
FIG. 6 is flow chart that illustrates the operation of a call processing system in an embodiment of the invention.

Second Embodiment Configuration and Operation—FIGS. 4–6

FIG. 4 illustrates wireless communications network 400 in an embodiment of the invention. Wireless communications network 400 includes mobile switching center (MSC) 410, MSC 480, base station system 440, base station system 445, base station system 450, communication device 460, and backhaul network 470. MSC 410 includes call processing system 420 and translator system 430. MSCs 410 and 480 are coupled to communication network 405. Communication network 405 could be a data network, an internet or intranet, or the PSTN. Base station systems 440 and 445 are coupled to call processing system 420 over backhaul network 470. Base station system 445 is coupled to translator system 430 over backhaul network 470. Base station system 445 is also coupled to MSC 480. Translator system 430 is coupled to call processing system 420. Translator system 430 is also coupled to MSC 480 over backhaul network 470.

Communication device 460 is in communication with base station systems 440, 445, and 450 over a wireless communication standard well known to those skilled in the art. Backhaul network 470 may include other devices, systems, or components not shown for the sake of brevity. Similarly, base station systems 440, 445, and 445 may include additional elements, such as digital signal processors, transceivers, and other components well known to those in the art. An MSC in this embodiment may include a radio network controller (RNC), a base station controller (BSC), or some other control system.

Communication device 460 could be any device capable of transmitting communications receivable by base station systems 440, 445, and 450. For example, communication device 460 could comprise a wireless phone, personal digital assistant (PDA), two-way radio, or a portable computer. Base station systems 440, 445, and 450 are base station systems capable of receiving wireless communications transmitted from communication device 460 and transferring the communications to MSCs 410 and 480. MSCs 410 and 480 are systems capable of controlling calls over wireless network 400.

MSC 410 and base station systems 440 and 445 are from a first vendor. MSC 480 and base station system 450 are from a second vendor. Base station systems 440 and 445 transfer call traffic in a different format than base station system 450. A format could comprise the arrangement of data within call traffic. Specifically, base station systems 440 and 445 communicate with call processing system 420 according to a proprietary format implemented by the first vendor. Base station system 450 communicates with MSC 480 and translator system 430 according to an IOS format implemented by the second vendor. One example of the IOS format comprises A3 and A7. Translator system 430 is a system capable of converting call traffic between the proprietary format and the IOS format.

FIG. 5 illustrates the operation of communication network 400 in an embodiment of the invention. The steps illustrated by FIG. 5 are not limited to the specific sequence provided and could occur in various sequences recognized by those having skill in the art.

To begin, communication device 460 transmits communications to base station systems 440, 445, and 450 (Step 710). The communications could be, for example, for a call from communication device 460 to a destination on communication network 405. The call could also be routed to a destination serviced by MSC 410. Base station systems 440 and 445 receive call traffic from communication device 460 and transfer the call traffic in the proprietary format over backhaul network 470 to call processing system 420 (Step 520). Call processing system 420 receives the call traffic in the proprietary format from base station systems 440 and 445 (Step 530).

Base station system 450 receives communications from communication device 460 and transfers call traffic in the IOS format over backhaul network 470 to translator system 430 (Step 540). Translator system 430 receives the call traffic from base station 450 and converts the call traffic from the IOS format to the proprietary format (Step 550). Next, translator system 430 transfers the call traffic in the proprietary format to call processing system 420 (Step 560). Call processing system 420 then receives the call traffic in the proprietary format from translator system 430 (Step 570). Lastly, call processing system 420 processes the call traffic from base station system 440, 445, and 450 (Step 580).

In an embodiment of the invention, translator system 430 receives call traffic in the proprietary format from either base station system 440 or 445 for a call. Base station system 450 transfers call traffic in the IOS format for the call to MSC 480. Translator system 430 converts the call traffic from the proprietary format to the IOS format and transfers the IOS traffic over backhaul network 470 to MSC 480. MSC 480 then processes the IOS call traffic for the call from base stations 440, 445, and 450.

FIG. 6 illustrates the operation of call processing system 420 in an embodiment of the invention. To begin, communication device 460 transmits communications for a call to base station systems 445 and 450. Call processing system 420 receives call traffic for the call from base station system 450 via translator system 430 (Step 610). Call processing system 420 notices that the call traffic from translator system 430 was delayed compared to corresponding call traffic received from base station system 445 (Step 620). The call traffic arrived late due to the delay caused by translating the call traffic from the IOS format to the proprietary format. Rather than immediately discarding the late call traffic because it was delayed, call processing system 420 processes the late call traffic to determine the quality of the delayed call traffic (Step 630). Call processing system 420 begins buffering the call traffic received from base station system 445. The buffered call traffic from base station system 445 is then compared to the corresponding delayed call traffic from base station system 445 to select which call traffic should be forwarded to communication network 405 (Step 650).

Table 1 illustrates a preferred algorithm for processing call traffic in call processing system 420. In this example, communication device 460 transmits communications for a call to all three base station systems 440, 445, and 450. Base station system 440, 445, and 450 transfer the call traffic in frames. The frames could be transferred in accordance with Code Division Multiple Access (CDMA) as is well known in the art. The frames could also be transferred in accordance with Frequency Division Multiple Access (FDMA), Time Division Multiple Access (TDMA), and Global System for Mobile communications (GSM). The frames contain sequences of bits in a specific format. The format determines the arrangement of the bits. Thus, call traffic transferred in a proprietary format includes frames with bits arranged according to the proprietary format. Call traffic transferred in an IOS format includes frames with bits arranged according to the open IOS format.

The algorithm allows for buffering of traffic frames of the fastest communication streams (or legs) received by call processing system 420 from base station systems 440, 445, and 450. Referring to FIG. 4, the first communication leg extends from base station system 440 to call processing system 420, the second communication leg extends from base station system 445 to call processing system 420, and the third communication leg extends from base station system 450 to call processing system 420.

Referring to Table 1, column 1 indicates a time sequence (T). Column 2 indicates the values stored in a first buffer of call processing system 420. Column 3 indicates the values stored in a second buffer of call processing system 420. Referring to the information illustrated in Columns 1 and 2 of Table 1, L(x,y) represents the value of communication leg x, frame sequence y. For example, L(1,2) represents the second frame received by call processing system 420 from the first communication leg.

TABLE 1

| Time | First Buffer | Second Buffer |
| --- | --- | --- |
| T = x | L(1, 1) | |
| | L(2, 1) | |
| T = x + delta | | L(1, 1) |
| | | L(2, 1) |
| T = x + 1 | L(1, 2) | L(1, 1) |
| | L(2, 2) | L(2, 1) |
| | | L(3, 1) |
| T = x + 1 + delta | | L(1, 2) |
| | | L(2, 2) |
| T = x + 2 | L(1, 3) | L(1, 2) |
| | L(2, 3) | L(2, 2) |
| | | L(3, 2) |
| T = x + 2 + delta | same pattern | same pattern |

Base station systems 440, 445, and 450 each transfer frames for a call from device 460. The frames indicate a sequence for call processing. At time T=x, call processing system 420 receives L(1,1) and L(2,1) into the first buffer. Call processing system 420 determines that the frame L(3,1) is late and at time T=x+delta moves L(1,1) and L(2,1) into the second buffer and begins synchronizing the sequence numbers.

By time T=x+1, L(3,1) has arrived at call processing system 420 and call processing system 420 has stored L(3,1) in the second buffer. By time T=x+1, L(1,2) and L(2,2) have also arrived at call processing system 420 and have been stored in the first buffer. Call processing system 420 compares the three frames stored in the second buffer and selects the best of the three. Call processing system 420 has completed synchronizing the sequence numbers. From this point forward, call processing system 420 knows the sequence in which frames will arrive from the three legs. In this example, frames from leg 3 arrive out of sequence by one frame compared to the first and second legs.

At time T=x+1+delta, call processing system 420 shifts frames L(1,2) and L(2,2) to the second buffer knowing that the third leg will arrive out of sequence by one frame. At time T=x+2, frames L(1,3), L(2,3) and L(3,1) arrive at call processing system 420. Call processing system 420 stores L(1,3) and L(2,3) in the first buffer and stores L(3,1) in the second buffer. The second buffer now holds L(1,2), L(2,2), and L(3,1). Call processing system 420 selects the best frame and continues operating according to the same pattern demonstrated herein.

Advantageously, call processing system 420 can utilize the algorithm depicted by Table 1 to execute important call processing operations such as call handoffs. A handoff is the process by which a mobile switching center (MSC) passes a call from one cell to another. There are two forms of handoff: hard and soft. A hard handoff is performed by the "break and make method" including breaking the connection to the original cell before making the connection to the successor cell. Frequency Division Multiple Access (FDMA), Time Division Multiple Access (TDMA), and Global System for Mobile communications (GSM) use hard handoffs. Hard handoffs require intricate timing mechanisms to handoff the call without significant service degradation. Soft handoffs occur by the "make and break" method including making the connection to the successor cell prior to breaking the connection to the original cell. Code Division Multiple Access (CDMA) uses soft handoffs.

Referring again to FIG. 4, if the caller roams from a cell serviced by base station system 440 to a cell serviced by base station system 445, MSC 410 can execute a successful hand-off because base station systems 440 and 445 transfer communications in a proprietary format that MSC 410 can process. If the call roams from cells serviced by base station systems 440 and 445 to a cell serviced by base station system 450, MSC 410 can also execute a successful hand-off from base station systems 440 and 445 to base station system 450 even though base station system 450 transfers call traffic in an IOS format. Another advantage of communication network 400 is the ability of MSC 420 to handoff a call from base station 450 to base station systems 440 or 445.

Figure 7:
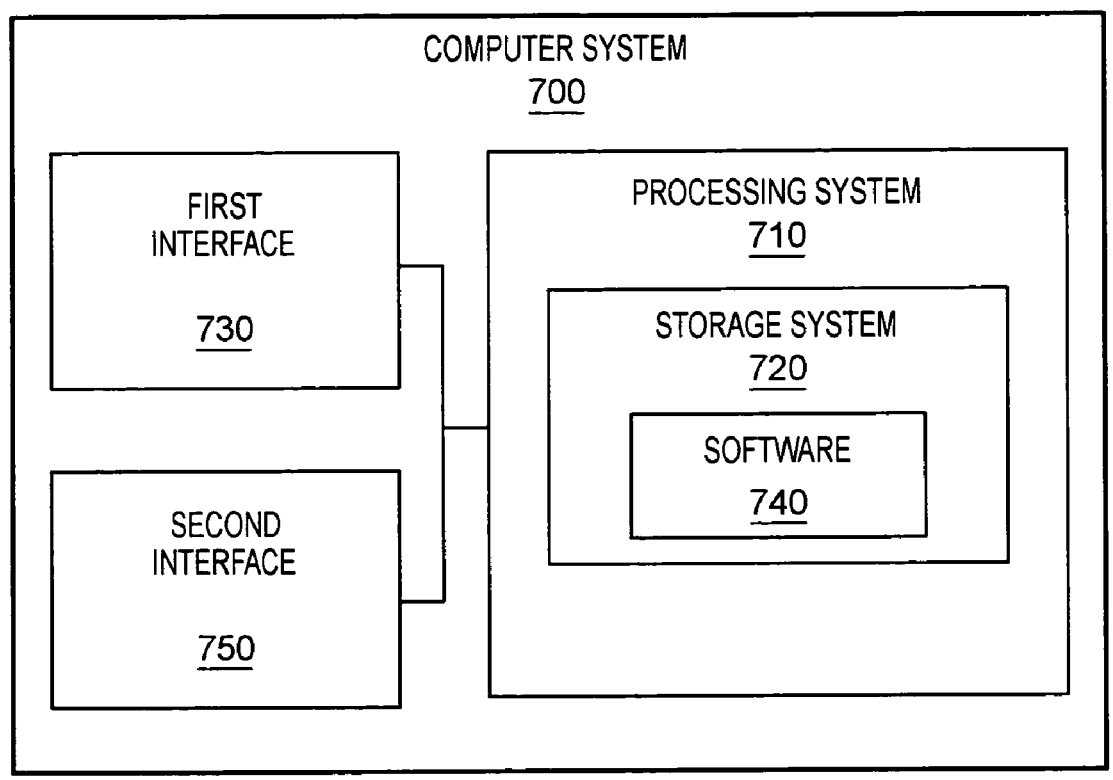
FIG. 7 illustrates a computer system in an embodiment of the invention.

Computer System Configuration—FIG. 7

FIG. 7 illustrates computer system 700 that could be used to implement aspects of the invention. In particular, computer system 700 could be used in communication networks 200 and 400, and in other similar communication systems. Computer system 700 includes processing system 710, storage system 720, software 740, first interface 730, and second interface 750. Storage system 720 stores software 740. Processing system 710 is linked to first interface 730 and second interface 750. Computer system 700 could be comprised of programmed general-purpose computers, although those skilled in the art will appreciate that programmable or special purpose circuitry and equipment may be used. Computer system 700 may use a client server architecture where operations are distributed among a server system and client devices that together comprise elements 710–750.

First and second interfaces 730 and 750 could comprise a network interface card, modem, port, or some other communication device. First and second interfaces 730 and 750 may be distributed among multiple communication devices. Processing system 710 could comprise a computer microprocessor, logic circuit, or some other processing device. Processing system 710 may be distributed among multiple processing devices. First and second interfaces 730 and 750 could comprise a keyboard, mouse, voice recognition interface, microphone and speakers, graphical display, touch screen, or some other type of user device. Storage system 720 could comprise a disk, tape, integrated circuit, server, or some other memory device. Storage system 720 may be distributed among multiple memory devices.

Processing system 710 retrieves and executes software 740 from storage system 720. Software 740 may comprise an operating system, utilities, drivers, networking software, and other software typically loaded onto a general-purpose computer. Software 740 could also comprise an application program, firmware, or some other form of machine-readable processing instructions. When executed by the processing system 710, software 740 directs the processing system 710 to operate as described for communication networks 200 and 400.

We claim:

1. A wireless communication network comprising:
a call processing system in a mobile switching center (MSC) coupled to a backhaul network;
a translator system coupled to the backhaul network and to the call processing system;
a first base station system coupled to the backhaul network, the first base station system, responsive to receiving communications for a call from a wireless communication device, transfers first call traffic for the call in a first format over the backhaul network to the call processing system;
a second base station system coupled to the translator system by the backhaul network, the second base station system, responsive to receiving the communications for the call from the wireless communication device, transfers second call traffic for the call in a second format over the backhaul network to the translator system wherein the second format is different than the first format;
the translator system, responsive to receiving the second call traffic in the second format from the second base station system, converts the second call traffic from the second format to the first format and transfers the second call traffic in the first format to the call processing system;
the call processing system, responsive to receiving the first call traffic and the second call traffic, processes the first call traffic and the second call traffic;
the first base station system, responsive to receiving the communications for the call from the wireless communication device, transfers third call traffic in the first format over the backhaul network to the translator system; and
the translator system, responsive to receiving the third call traffic in the first format over the backhaul network, converts the third call traffic in the first format to the second format and transfers the third call traffic in the second format to another call processing system.

2. The wireless communication network of claim 1 wherein the call processing system, responsive to receiving the first call traffic and the second call traffic, determines if the second call traffic is delayed compared to the first call traffic.

3. The wireless communication network of claim 2 wherein the call processing system, responsive to a determination that the second call traffic is delayed, buffers the first call traffic to synchronize the first call traffic and the second call traffic.

4. The wireless communication network of claim 3 wherein the call processing system selects either the first call traffic or the second call traffic based on a quality of the first call traffic and a quality of the second call traffic.

5. The wireless communication network of claim 1 wherein the call processing system, the translator system, and the first base station system are from a first vendor, and the second base station system is from a second vendor.

6. The wireless communication network of claim 1 wherein the first format comprises a proprietary format and the second format comprises an Inter-vendor Operating System (IOS) format.

7. A method of operating a wireless communication network for wireless communications wherein the wireless communication network comprises a call processing system in a mobile switching center (MSC) coupled to a backhaul network, a translator system coupled to the call processing system and the backhaul network, a first base station system coupled to the backhaul network, and a second base station system coupled to the backhaul network, the method comprising the steps of:
receiving communications for a call in the first base station system from a wireless communication device;
transferring first call traffic for the call in a first format from the first base station over the backhaul network to the call processing system in the MSC;
receiving communications for the call in the second base station from the communication device;
transferring second call traffic for the call in a second format from the second base station over the backhaul network to the translator system, wherein the second format is different than the first format;
receiving the second call traffic in the second format from the second base station system in the translator system;
converting the second call traffic from the second format to the first format in the translator system;
transferring the second call traffic in the first format from the translator system to the call processing system in the MSC;
receiving the first call traffic and the second call traffic in the call processing system and processing the first call traffic and the second call traffic;
transferring third call traffic in the first format over the backhaul network to the translator system;
receiving the third call traffic from the wireless communication device in the first format in the translator system;
converting the third call traffic in the first format to the second format; and
transferring the third call traffic in the second format to another call processing system.

8. The method of claim 7 further comprising the step of:
receiving the first call traffic and the second call traffic in the call processing system and determining if the second call traffic is delayed compared to the first call traffic.

9. The method of claim 8 further comprising the step of:
responsive to determining that the second call traffic is delayed, buffering the first call traffic to synchronize the first call traffic with the second call traffic.

10. The method of claim 9 further comprising the step of:
selecting either the first call traffic or the second call traffic based on a quality of the first call traffic and a quality of the second call traffic.

11. The method of claim 7 wherein the call processing system, the translator system, and the first base station system are from a first vendor, and wherein the second base station system is from a second vendor.

12. The method of claim 7 wherein the first format comprises a proprietary format and wherein the second format comprises an Inter-vendor Operating System (IOS) format.

* * * * *